United States Patent
Park et al.

(10) Patent No.: US 9,336,577 B2
(45) Date of Patent: *May 10, 2016

(54) IMAGE PROCESSING APPARATUS FOR REMOVING HAZE CONTAINED IN STILL IMAGE AND METHOD THEREOF

(71) Applicants: SK TELECOM CO., LTD., Seoul (KR); KOREA UNIVERSITY RESEARCH AND BUSINESS FOUNDATION, Seoul (KR)

(72) Inventors: Yongsup Park, Seoul (KR); Donghahk Lee, Seoul (KR); Changsu Kim, Seoul (KR); Jinhwan Kim, Goyang-si (KR); Wondong Jang, Seoul (KR)

(73) Assignees: SK TELECOM CO., LTD., Seoul (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,067

(22) Filed: Nov. 3, 2014

(65) Prior Publication Data

US 2015/0063719 A1 Mar. 5, 2015

Related U.S. Application Data

(63) Continuation of application No. PCT/KR2013/003855, filed on May 3, 2013.

(30) Foreign Application Priority Data

May 3, 2012 (KR) .................. 10-2012-0046710

(51) Int. Cl.
*G06T 5/00* (2006.01)

(52) U.S. Cl.
CPC .............. *G06T 5/008* (2013.01); *G06T 5/003* (2013.01); *G06T 2207/10004* (2013.01); *G06T 2207/20021* (2013.01); *G06T 2207/20024* (2013.01); *G06T 2207/20192* (2013.01)

(58) Field of Classification Search
USPC ............................................ 382/274, 167, 254
See application file for complete search history.

(56) References Cited

U.S. PATENT DOCUMENTS

| 2012/0213436 A1* | 8/2012 | Grindstaff ............... G06T 5/008 382/167 |
| 2015/0071563 A1* | 3/2015 | Park ....................... G06T 5/007 382/274 |

FOREIGN PATENT DOCUMENTS

| JP | 2012027547 A | 2/2012 |
| KR | 100829581 B1 | 5/2008 |

(Continued)

OTHER PUBLICATIONS

International Search Report for application No. PCT/KR2013/003855 dated Aug. 30, 2013, citing the above reference(s).

(Continued)

*Primary Examiner* — Ishrat I Sherali
(74) *Attorney, Agent, or Firm* — Hauptman Ham, LLP

(57) ABSTRACT

An image processing apparatus for removing haze from an image includes a haze brightness measurer, a transmission estimator and an image reconstructor. The haze brightness measurer is configured to measure haze brightness in the image. The transmission estimator is configured to estimate a blockwise transmission based on a final cost function value calculated by a contrast and an image loss of the image, and to estimate a pixelwise transmission by using the blockwise transmission. The image reconstructor is configured to generate a reconstructed image by using the haze brightness and the pixelwise transmission.

14 Claims, 8 Drawing Sheets

(56) References Cited

FOREIGN PATENT DOCUMENTS

| KR | 1020090097005 A | 9/2009 |
| KR | 1020100021952 A | 2/2010 |
| KR | 1020110119989 A | 11/2011 |

OTHER PUBLICATIONS

Kim, Jin-Hwan et al., Single Image Dehazing Based on Contrast Enhancement, IEEE International Conference on Acoustics, Speech and Signal Processing (ICASSP), 2011 IEEE International Conference on, May 22-27, 2011, pp. 1273-1276; doi: 10.1109/ICASSP.2011.5946643.

Tarel, Jean-Philippe et al., Fast Visibility Restoration from a Single Color or Gray Level Image, in Computer Vision, 2009 IEEE 12th International Conference on, Sep. 29, 2009-Oct. 2, 2009, pp. 2201-2208; doi: 10.1109/ICCV.2009.5459251.

He, Kaiming et al., Guided Image Filtering, ECCV'10 Proceedings of the 11th European Conference on Computer Vision: Part 1, 2010, pp. 1-14, Springer-Verlag Berlin, Heidelberg; ISBN:3-642-15548-0 978-3-642-15548-2.

* cited by examiner (a) Input Image  (b) Blockwise Transmission  (c) Pixelwise Transmission

IMAGE PROCESSING APPARATUS FOR REMOVING HAZE CONTAINED IN STILL IMAGE AND METHOD THEREOF

CROSS-REFERENCE TO RELATED APPLICATION

The present application is a continuation of International Patent Application No. PCT/KR2013/003855, filed May 3, 2013, which claims priority to Korean Patent Application No. 10-2012-0046710, filed on May 3, 2012. The disclosures of the above-listed application are hereby incorporated by reference herein in their entirety.

TECHNICAL FIELD

The present disclosure in one or more embodiments relates to an image processing apparatus and method for removing haze contained in a still image.

BACKGROUND

The statements in this section merely provide background information related to the present disclosure and may not constitute prior art.

Haze is an atmospheric phenomenon of water vapor floating in the form of condensed droplets. A hazy environment typically causes an obstruction to vision of less than 1 km of visibility. Such a foggy weather introduces particulate water droplets which in turn cause scattering of light. The scattering of light represents directional changes of traveling light as it collides with airborne particles. The light scattering differs by the wavelength of light and the particle size.

Light scattering can be generally divided into Rayleigh scattering and Mie scattering. The Rayleigh scattering applies when the size of the particles that cause the scattering is smaller than the wavelength of light where the scattering energy is inversely proportional to the fourth power of the wavelength. This is exemplified by the blue hue of the sky in a sunny day when air molecules scatter the light by scattering more blue than red. However, the Mie scattering theory applies to the light scattering when the size of the responsible particles is greater than the wavelength of light. Haze follows the Mie scattering theory since the particles of haze have the diameter as large as a few μm to a few tens of μm over the wavelength of 400 nm~700 nm of visible light. According to the Mie scattering theory, with larger scattering particles like water droplets in the atmosphere, the amount of scattering is less influenced by the wavelength to cause near-even scattering of all the light in the visible light zone. Therefore, when the condition is hazy, objects exhibit a blurred image. A new light source called airlight is generated.

Image quality improvement through correction of the haze distortion may resolve the visibility obstruction and sharpen fuzzy images. In addition, such image quality improvement is a pre-processing step for recognition of the subjects by restoring damaged information on letters, objects, and the like due to the haze.

Dehazing technologies may be roughly categorized into a non-model approach and a model approach.

An example of the non-model approach includes histogram equalization. The histogram equalization is a method for analyzing a histogram of an image to adjust distribution. The histogram equalization is easily achieved and provides an improved effect in some situations, but is not proper for a hazy image having a non-uniform depth in other situations. In addition, the histogram equalization is proper for improving general image quality in some situations, but does not satisfactorily reflect characteristics of an influence that haze has on an image in other situations. For an image containing thick haze, improvement is insignificant in some situations.

The model approach includes modeling an influence that a scattering phenomenon of light due to haze has on an image. A technology includes comparing two or more images obtained in different weathers to estimate and correct a scene depth, thereby correcting distortion due to haze. This technology uses input of at least two images under different weathers. For a real-time implementation, weather changes are monitored and images are stored. In some situations, it is difficult to determine a storage period since it is difficult to predict a weather change cycle. In some situations, images of the same scene are to be captured, which is difficult due to moving objects causing errors during estimation of the degree of haze distortion.

Another technology for correcting distortion due to haze includes estimating and subtracting the amount of change of pixel values of an image due to the haze. This technology is based on the assumption that the haze is uniform, which is best applicable to uniform and thin haze. However, most real world haze tends to be non-uniform. In addition to the assumption that the haze is uniform, the degree of the haze influence further depends on the distance between a camera and an object.

Other image contrast improvement methods, such as histogram equalization or gamma correction, may improve a contrast over an image. In some situations, the image contrast is difficult to improve in a hazy image having a contrast decreasing differentially by depth information of the image.

SUMMARY

In accordance with some embodiments of the present disclosure, an image processing apparatus for removing haze from an image, comprises a haze brightness measurer, a transmission estimator and an image reconstructor. The haze brightness measurer is configured to measure haze brightness in the image. The transmission estimator is configured to estimate a blockwise transmission based on a final cost function value calculated by a contrast and an image loss of the image, and to estimate a pixelwise transmission by using the blockwise transmission. The image reconstructor is configured to generate a reconstructed image by using the haze brightness and the pixelwise transmission.

In accordance with some embodiments of the present disclosure, a method performed by at least one processor for dehazing an image comprises (a) measuring haze brightness in the image; (b) estimating a blockwise transmission based on a final cost function value calculated by a contrast and an image loss of the image, and estimating a pixelwise transmission by using the blockwise transmission; and (c) generating a reconstructed image by removing haze from the image using the haze brightness and the pixelwise transmission.

In accordance with some embodiments of the present disclosure, a non-transitory computer readable medium contains executable codes for causing, when executed by at least one processor, the at least one processor to perform the method as described above.

DETAILED DESCRIPTION

Hereinafter, at least one embodiment of the present disclosure will be described in detail with reference to the accompanying drawings.

In the present disclosure, haze may be atmospheric mist or fog. Alternatively, the haze may be yellow sand, dust, or airborne matters. Other environments and/or conditions with haze are within the scope of various embodiments.

An image processing apparatus in accordance with some embodiments reconstructs an image containing haze using Equation 1.

$$I_p = J_p t_p + (1-t_p) \cdot A \quad \text{Equation 1}$$

Here, $I_p$ is a brightness value of a pixel p of an obtained image (or input image or hazy image, e.g., an image influenced by haze), $J_p$ is the brightness value of the pixel p of the reconstructed image (or output image, e.g., a dehazed image or an image not influenced by haze), $t_p$ is a transmission which indicates a concentration rate of the haze that is transmitted to pixel p from a pixel selected as a haze brightness, and A is a haze brightness value.

In one or more embodiments, the image processing apparatus generates a cost function taking into account of a contrast $E_C$ and an image loss $E_L$ which may be incurred when improving the contrast, calculates a transmission 't' by which the least cost function value is generated, and reconstructs a dehazed image by using Equation 1.

Hereinafter, reconstruction of a still image containing haze, performed by the image processing apparatus using Equation 1 will be described with reference to the drawings.

Figure 1:
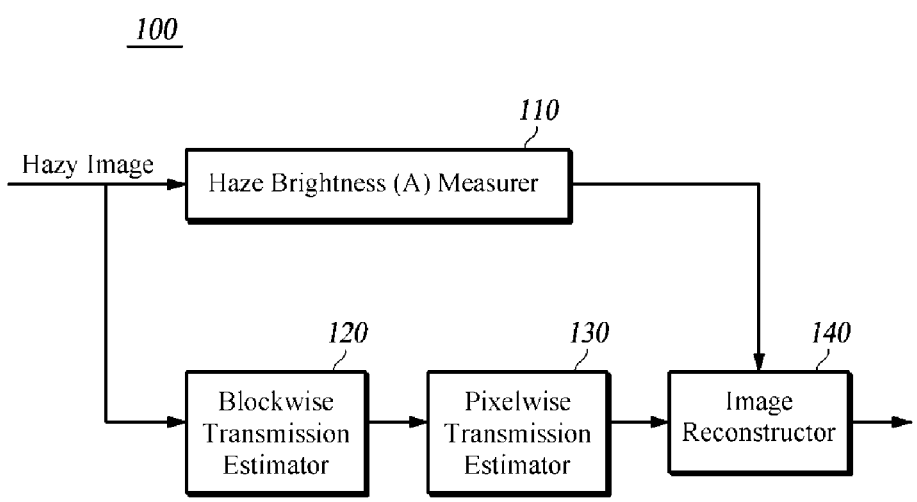
FIG. 1 is a block diagram of a configuration of an image processing apparatus for removing haze contained in a still image according to at least one embodiment.
Figure 2:
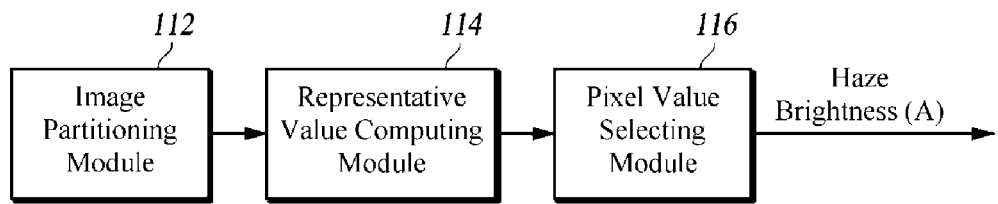
FIG. 2 is a block diagram of a detailed configuration of a haze brightness measurer shown in FIG. 1.
Figure 3:
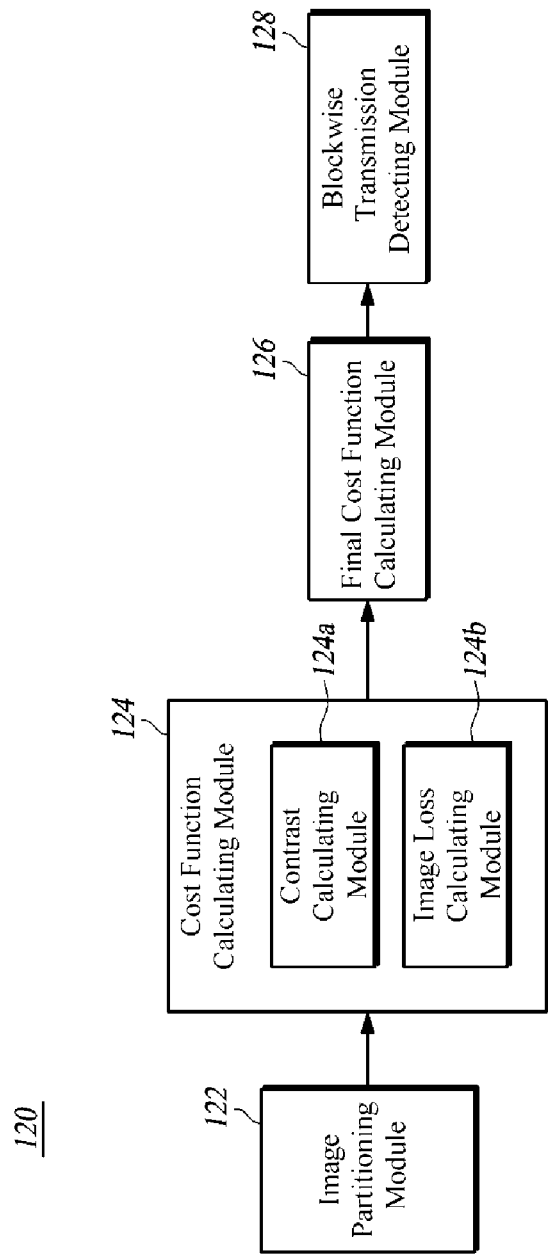
FIG. 3 is a block diagram of a detailed configuration of a blockwise transmission estimator shown in FIG. 1.
Figure 4:
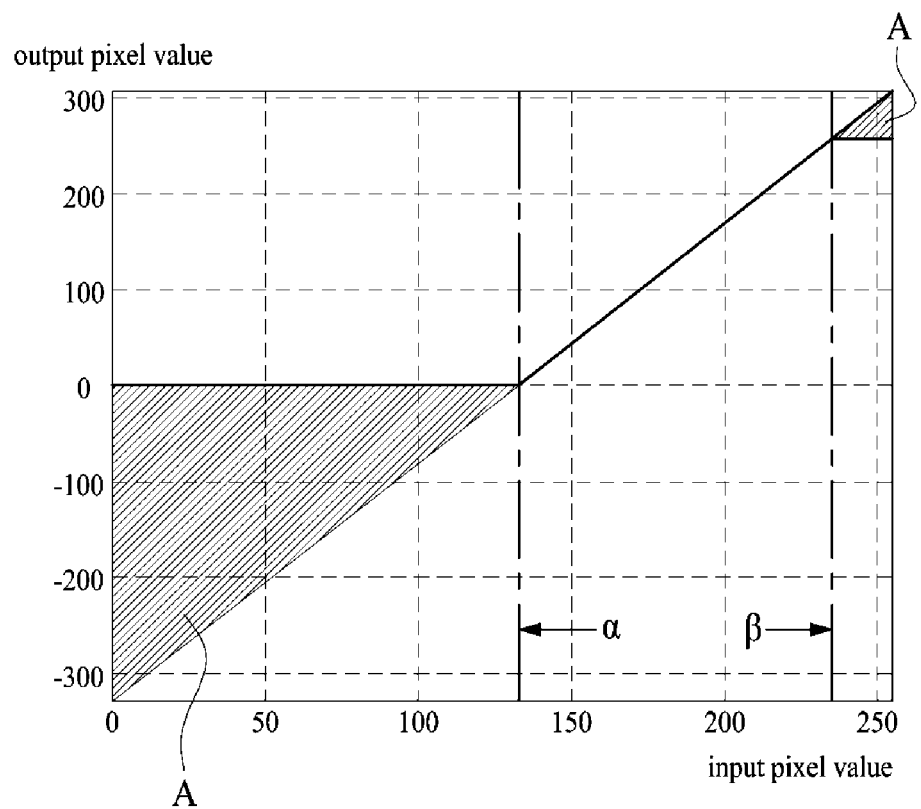
FIG. 4 is a diagram for illustrating a concept of image loss minimization.

FIG. 1 is a block diagram of a configuration of an image processing apparatus for removing haze contained in a still image according to at least one embodiment. FIG. 2 is a block diagram of a detailed configuration of a haze brightness measurer shown in FIG. 1. FIG. 3 is a block diagram of a detailed configuration of a blockwise transmission estimator shown in FIG. 1. FIG. 4 is a diagram for illustrating a concept of image loss minimization.

Referring to FIG. 1, an image processing apparatus 100 for removing haze included in a still image includes a haze brightness measurer 110, a blockwise transmission estimator 120, a pixelwise transmission estimator 130 and an image reconstructor 140.

The haze brightness measurer 110 partitions an image containing haze into a predetermined number of blocks to obtain a representative value for each block, selects block having the largest representative value among the obtained representative values, and repeats to partition the selected block into the predetermined number of blocks until the area of the selected block gets equal to or less than a preset area and to obtain a representative value, and thereby obtains haze brightness. The image containing the haze may be a still image in one or more embodiments.

In some embodiments, to obtain the haze brightness, it is assumed in one or more embodiments that 'haze is atmospheric light arrived from the sun (or another light source) and thus has a high brightness value' and that 'a pixel value (e.g., a brightness value of a pixel) influenced by haze approximates the haze brightness'. In addition, referring to Equation 1, the obtained image is influenced by haze in proportion to the transmission. Therefore, since most values of a region greatly influenced by the haze are distributed around the haze value, a standard deviation is reduced.

When combining the above two assumptions, the haze brightness value has a high brightness value in the image and is obtainable from the region most greatly influenced by the haze. In some situations where the haze brightness is selected as the brightest pixel value of the entire obtained image, if a white object is included in the obtained image, the white object may be inaccurately selected as the haze brightness. As a solution, in some embodiments, the obtained image is divided into blocks which are gradually reduced to smaller sizes which are then detected, in order to narrow down the candidate haze brightness values to the minimum (e.g., a block with a preset area or smaller) wherein most of the component pixel values are considered as influenced by the haze brightness value, and then the brightest pixel value in the block with the preset area or smaller is selected as the haze brightness value with little concern for probable errors. Consequently, the haze brightness measurer 110 may select the brightest pixel value as the haze brightness value.

Referring to FIG. 2, the haze brightness measurer 110 includes an image partitioning module 112, a representative value computing module 114, and a pixel value selecting module 116.

The image partitioning module 112 partitions an image containing haze into a predetermined number of blocks. The predetermined number of blocks may be four in one or more embodiments.

To obtain a representative value for each block, the image partitioning module 112 uses, in one or more embodiments, the average brightness and standard deviation of pixel values in each block. The average brightness and standard deviation may differ depending upon the size of each block. For example, to obtain a representative value by using a block having size 20×20, a representative value may be selected to be high at the presence of a bright object, such as a white building or white vehicle in a hazeless region. Increasing the size of the block will render the representative value to be selected from a more haze side while making the haze brightness value difficult to find in the block. For this reason, by partitioning an image into blocks, blocks are gradually reduced to smaller sizes to narrow down the candidate haze brightness values.

The representative value computing module 114 obtains the average and standard deviation of pixels for each of the blocks partitioned by the image partitioning module 112, and obtains a representative value of each block based on a difference between the average and standard deviation of the respective block.

That is, the haze brightness value has a high brightness value in the image and is obtainable from the region that is most affected by the haze. Since most values of the region greatly influenced by the haze are distributed around the haze brightness value, a standard deviation is reduced. In order to obtain the haze brightness value, therefore, the representative value computing module 114 calculates a representative value as a difference of the average and standard deviation of each block.

The pixel value selecting module 116 selects the block having the largest representative value from those obtained for the respective blocks and, when the area of the selected block is equal to or less than a preset area, selects the brightest pixel value of the selected block as the haze brightness.

In the case that the block sizes are narrowed down to a final value (a block with the preset area or smaller), most of the pixel values in the block are considered as influenced by the haze brightness value, which leaves little concern for probable errors even when selecting the brightest pixel value as the haze brightness value. Accordingly, when the block area gets equal to the preset area or smaller, the pixel value selecting module 116 selects the brightest pixel value as the haze brightness value.

The pixel value selecting module 116 selects the block having the largest representative value and determines whether the area of the selected block is equal to or less than the preset area. The preset area of the block is determined as a multiplication of length (number of pixels) by width (number of pixels) of the block. In at least one embodiment, the preset area may be, for example, 200. Upon determining that the area of the selected block becomes equal to or less than 200, the pixel value selecting module 116 selects the brightest pixel value of the selected block and estimates the selected pixel value as the haze brightness.

Upon determining that the area of the selected block is greater than 200, the process returns to the image partitioning module 112 which then partitions the selected block into a predetermined number (e.g., 4) of smaller blocks. The representative value computing module 114 then obtains a representative value for each smaller block. The pixel value selecting module 116 then selects one of the smaller blocks having the largest representative value, and determines whether the area of the selected smaller block is equal to or less than the preset area. The process is repeated until this process selects a block having an area equal to or less than the preset area, and the pixel value selecting module 116 estimates the brightest pixel value of the selected block as the haze brightness.

Referring back to FIG. 1, the blockwise transmission estimator 120 partitions the image containing the haze into a predetermined number of blocks, obtains a contrast per block and an image loss per block, and estimates a blockwise transmission by using a final cost function calculated by the contrast and the image loss.

Referring to FIG. 3, the blockwise transmission estimator 120 includes an image partitioning module 122, a cost function calculating module 124, a final cost function calculating module 126 and a blockwise transmission detecting module 128.

The image partitioning module 122 partitions the image containing the haze into a predetermined number of blocks. If the size of each block is too small, it is difficult in one or more embodiments to estimate a transmission. For this reason, the minimum size of each block is set to 16×16 or more in one or more embodiments. The number of the blocks may be arbitrarily determined. Image partitioning is performed to compensate for a haze component in consideration of the effect of non-uniform haze. The number of the blocks based on image partitioning may be properly determined in consideration of hardware complexity.

In addition, Equation 1 is used to reconstruct an image. In at least one embodiment, only information on the haze brightness value obtained by the haze brightness measurer 110 leaves an underdetermined problem where the equation is overdominated by unknown quantities in calculating transmission $t_p$ and reconstructed brightness value $J_p$ for each pixel. On the assumption that transmission $t_p$ in the block is uniform (and referred to herein as blockwise transmission) for all pixels in the block, therefore, the number of the unknown quantities may be greatly reduced to B+1 for B equations (where B is the number of pixels in the block). The image is partitioned in consideration of local depth information (i.e., blockwise transmission) because an assumption that the whole undivided image has a single uniform transmission 't' precludes, in some situations, an adaptive compensation for image deterioration according to image depth information.

The cost function calculating module 124 calculates a contrast and an image loss for each of the blocks partitioned by the image partitioning module 122 while changing the transmission t within a predetermined range by a predetermined rate.

To calculate transmission 't', the following conditions are to be satisfied in one or more embodiments: (1) the output image contrast determined based on transmission 't' to be large and (2) the output image loss determined based on transmission 't' to be small.

In one or more embodiments, the cost function calculating module 124 generates cost functions considering a contrast $E_C$ and an image loss $E_L$ which may be incurred when improving the contrast, and calculates a contrast and an image loss by using the corresponding cost functions.

In one or more embodiments, the cost function calculating module 124 includes a contrast calculating module 124a for obtaining a contrast and an image loss calculating module 124b for obtaining an image loss.

The contrast calculating module 124a obtains a contrast (or cost function) $E_C$ by using variance $\delta^2$ based on a brightness value of each pixel in each block as represented by Equation 2.

$$E_C = -\sigma^2 = \sum_{p=1}^{N} \frac{(J_p - \bar{J})^2}{N} \qquad \text{Equation 2}$$

Here, N is the number of pixels in each block, $J_p$ is the brightness value at pixel p in the block as described herein, and $\bar{J}$ is the average brightness value of $J_p$ at all pixels in the block.

Equation 2 uses RMS (root mean square) contrast. In the RMS contrast, the contrast is measured by using a variance value of the image.

In one or more embodiments, for the sake of the desired large contrast of the output image determined by transmission 't', various cost function values based on Equation 2 are generated for various values of the transmission t, and for the purpose of finding transmission 't' by which its cost function is generated to have the least (optimized) value and based on the fact that the RMS contrast increases the value of contrast as it improves, a minus (−) symbol is added to the cost function such that the cost function is decreased as the transmission is decreased.

In other words, the contrast calculating module 124a carries out a blockwise multiplication by −1 (minus one) of variance generated by using a brightness value of each pixel to calculate a contrast. Equation 2 may be referred to as a first cost function (or a contrast improving cost function). The first cost function is a function for finding a transmission by which a contrast of a reconstructed image is maximized. In some situations, a blockwise transmission maximizing the contrast converges on '0'. As the blockwise transmission converges on '0', an input pixel value-to-output pixel value is determined to be exceeding a predetermined pixel value range. An example predetermined pixel value range is from 0 to 255, which is the pixel value range generally used by a computer for image handling or processing.

When the blockwise transmission converges on '0', output pixel values equal to or less than '0' or equal to or greater than '255' are present as an image loss which is to be minimized in one or more embodiments. The image loss refers to an amount obtained when output pixel values equal to or less than '0' or equal to or greater than '255' are rounded off to 0 and 255, respectively.

In one or more embodiments, to minimize the image loss, the image loss calculating module 124b calculates an image loss per block by using a second cost function according to Equation 3.

$$E_L = \sum_{p<0} \frac{(0-J_p)^2}{N} + \sum_{p>255} \frac{(J_p-255)^2}{N}$$ Equation 3

When graphically expressing the concept of Equation 3, FIG. 4 shows the corresponding area of region A.

Referring to FIG. 4, region A corresponds to pixel values equal to or less than '0' or equal to or greater than '255', i.e., an image loss.

After the contrast and the image loss are obtained through Equations 2 and 3, the final cost function calculating module 126 obtains a final cost function value for each block based on the obtained contrast and image loss of the respective block.

To calculate transmission 't', the following conditions are to be satisfied in one or more embodiments: (1) the output image contrast determined based on transmission 't' to be large and (2) the output image loss determined based on transmission 't' to be small. In search of a transmission that satisfies the above two conditions, the two conditions are to be transformed into a final cost function to find a transmission for generating the least final cost function value. In other words, when the final cost function comes to have the least value, it is considered, in one or more embodiments, that a contrast of an output image is large, and an image loss is small.

A final cost function includes both of the two conditions. In some embodiments, when the blockwise transmission is calculated, a final cost function such as Equation 4 including both of the conditions is generated for use in calculating the final cost function value.

$$E = E_C + \lambda_L E_L$$ Equation 4

Here, E is a final cost function value of each block, $E_C$ a contrast value of the respective block, $E_L$ an image loss of the respective block, and $\lambda_L$ an image loss coefficient.

The blockwise transmission detecting module 128 detects a transmission generating a least final cost function value from the final cost function values calculated by the final cost function calculating module 126 as a blockwise transmission. In particular, the blockwise transmission is a value ranging from 0 to 1. In at least one embodiment, the blockwise transmission detecting module 128 calculates final cost function values while changing values of the transmission from 0 to 1 and detects a transmission for generating a least final cost function value from the calculated final cost function value as the blockwise transmission. The values of the transmission from 0 to 1 may include, in one or more embodiments, 0.1, 0.2 and so on. The values of the transmission may be changed at any intervals or rates in one or more embodiments.

Referring back to FIG. 1, the pixelwise transmission estimator 130 applies the blockwise transmission detected by the blockwise transmission estimator 120 to convert the blockwise transmission of each block into a pixelwise transmission, i.e., an individual transmission for each pixel in the block. in one or more embodiments, an edge preserving filter is used for such conversion. The edge-preserving filter generates pixelwise approximate transmissions by using pixel values of the input image (i.e., the obtained image containing haze).

In one or more embodiments, the pixelwise transmission estimator 130 calculates a pixelwise approximate transmission by using Equation 5.

$$\hat{t}_p = aI_p + b$$ Equation 5

Here $\hat{t}_p$ is a pixelwise approximate transmission at pixel p, $I_p$ is brightness value at pixel p of the input image captured by a camera, and a and b are variables of a linear function calculated by applying the edge-preserving filter.

In one or more embodiments, an input image has brightness values between 0 and 255 while transmission t has a value between 0 and 1. In at least one embodiment, Equation 5 is to express 't' with an input image by scaling down the brightness values of the input image between 0 and 255 to 0-1 through the variables a and b and by approximating the size (the average value).

Therefore, the pixelwise transmission estimator 130 calculates such variables a and b that generate the least difference between the blockwise transmission and the approximate transmission to obtain a pixelwise transmission. In some embodiments, the variables a and b are calculated by using a window of size W and, with a shift to the next pixel, a and b are calculated. In an overlapped region, the variables a and b are averaged.

In one or more embodiments, Equation 6 is defined as follows to minimize the difference between the blockwise transmission and the approximate transmission.

$$\sum_{p \in B}(t_p - \hat{t}_p)^2$$ Equation 6

Here, p is a pixel in a block of size B (i.e., the block has B pixels), $t_p$ is the blockwise transmission determined by the blockwise transmission estimator 120 for the block and $\hat{t}_p$ is a pixelwise approximate transmission at pixel p.

In one or more embodiments, to find a and b for generating Equation 6 with the least value, the pixelwise transmission estimator 130 uses a least square method used in linear algebra.

Therefore, the pixelwise transmission estimator 130 detects the approximate transmission based on variables a and b obtained through the least square method as a pixelwise transmission. For example, the pair of values a and b, that has been found to result in Equation 6 having the least value, is applied to Equation 5 to calculate the pixelwise transmission for each pixel p in block B.

Data of an image changes by every pixel. however, as the blockwise transmission has been calculated in blocks, a blocking effect is exhibited at the boundaries of the blocks, due to differences between the blockwise transmission of each of the neighboring blocks. The blocking effect is a phenomenon in which the pixel values differ greatly at the boundaries of the blocks. In one or more embodiments, to remove the blocking effect, the blockwise transmission calculated in blocks is converted into a pixelwise transmission for each pixel.

The blockwise transmission estimator 120 and the pixelwise transmission estimator 130 may be configured as a single component in one or more embodiments. In this case, the blockwise transmission estimator 120 and the pixelwise transmission estimator 130 may be integrated into a single transmission estimator.

The image reconstructor 140 removes haze from the input image by using the haze brightness obtained by the haze brightness measurer 110 and the pixelwise transmission obtained by the pixelwise transmission estimator 130.

In one or more embodiments, the image reconstructor 140 generates a dehazed image by using Equation 7 which is equivalent to Equation 1.

$$J_p = \frac{I_p - A}{t_p} + A \qquad \text{Equation 7}$$

Here, $I_p$ is the brightness value of pixel p in the input image captured by a camera, $J_p$ is the brightness value of pixel p in the reconstructed (or dehazed) image, A is the haze brightness, and $t_p$ is a pixelwise transmission at pixel p.

Figure 5:
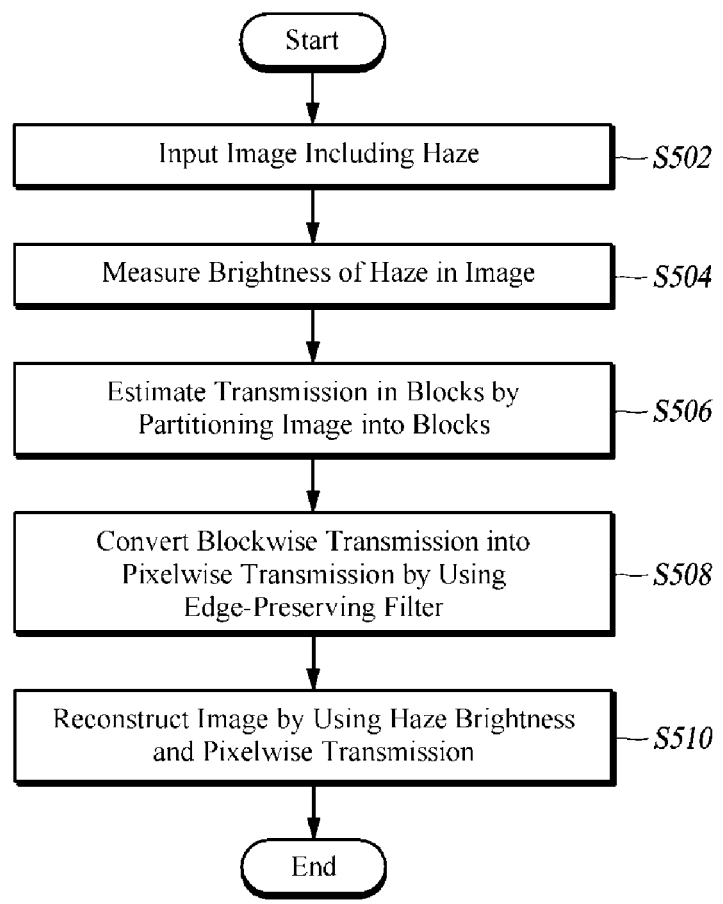
FIG. 5 is a flowchart of a method for reconstructing a still image containing haze, performed by an image processing apparatus according to at least one embodiment.
Figure 6:
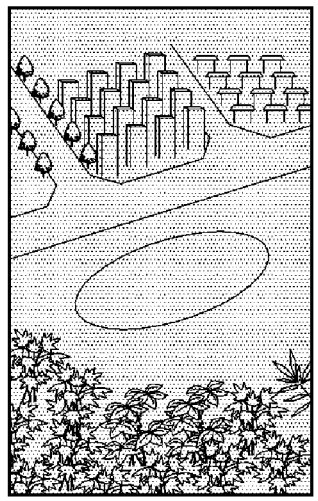
FIG. 6 is a diagram showing an example screen with an edge-preserving filter applied according to at least one embodiment.
Figure 6:
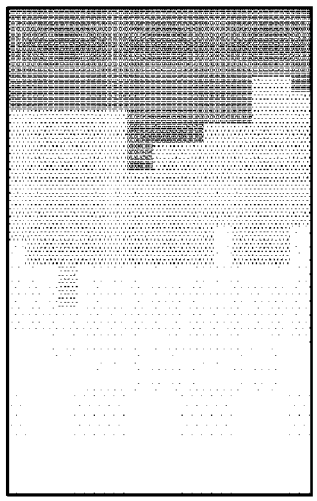
Figure 6:
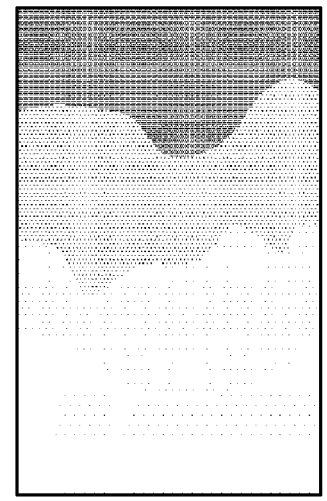
Figure 6:
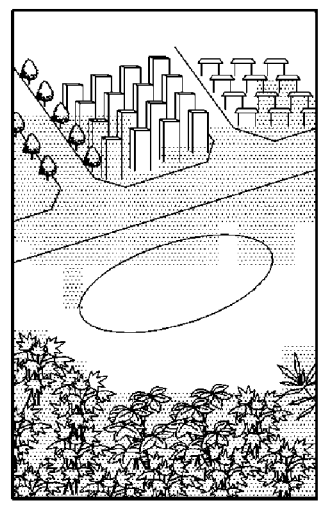
Figure 6:
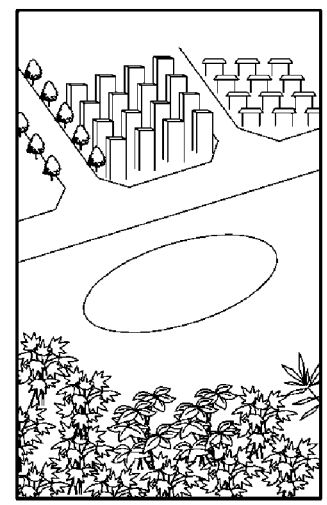

FIG. 5 is a flowchart of a method for reconstructing (or dehazing) a still image containing haze, performed by an image processing apparatus according to at least one embodiment, and FIG. 6 is a diagram showing an example of a screen as applied with an edge-preserving filter according to at least one embodiment.

Referring to FIG. 5, when an image containing haze is input to the image processing apparatus (S502), it measures (or calculates) the haze brightness in the image (S504). A method for measuring the haze brightness in the image, performed by the image processing apparatus, will be described in detail with reference to FIG. 7.

Upon completing step S504, the image processing apparatus estimates a blockwise transmission for each block after partitioning the image containing the haze into a predetermined number of blocks (S506).

A method performed by the image processing apparatus for estimating the blockwise transmission will be described in detail with reference to FIG. 8.

Upon completing step S506, the image processing apparatus converts the blockwise transmission for each block into a pixelwise transmission at each pixel by subjecting the blockwise transmission to an edge-preserving filter (S508).

Subsequently, the image processing apparatus generates a dehazed image by using Equation 7, using the haze brightness and the pixelwise transmission (S510).

The following description addresses a case of the image processing apparatus applying an edge-preserving filter to an image containing haze with reference to FIG. 6.

Referring to FIG. 6, when a still image containing haze as shown in FIG. 6 (a) is applied with a blockwise transmission, the resultant image obtained is as shown in FIG. 6 (b). A pixelwise transmission through the edge-preserving filter is applied to the image in FIG. 6(b) to obtain an image as shown in FIG. 6 (c). The image in FIG. 6 (c) may be an image obtained by estimating a concentration of haze per pixel through the calculation of the transmission and differentially removing the haze for each pixel.

Figure 7:
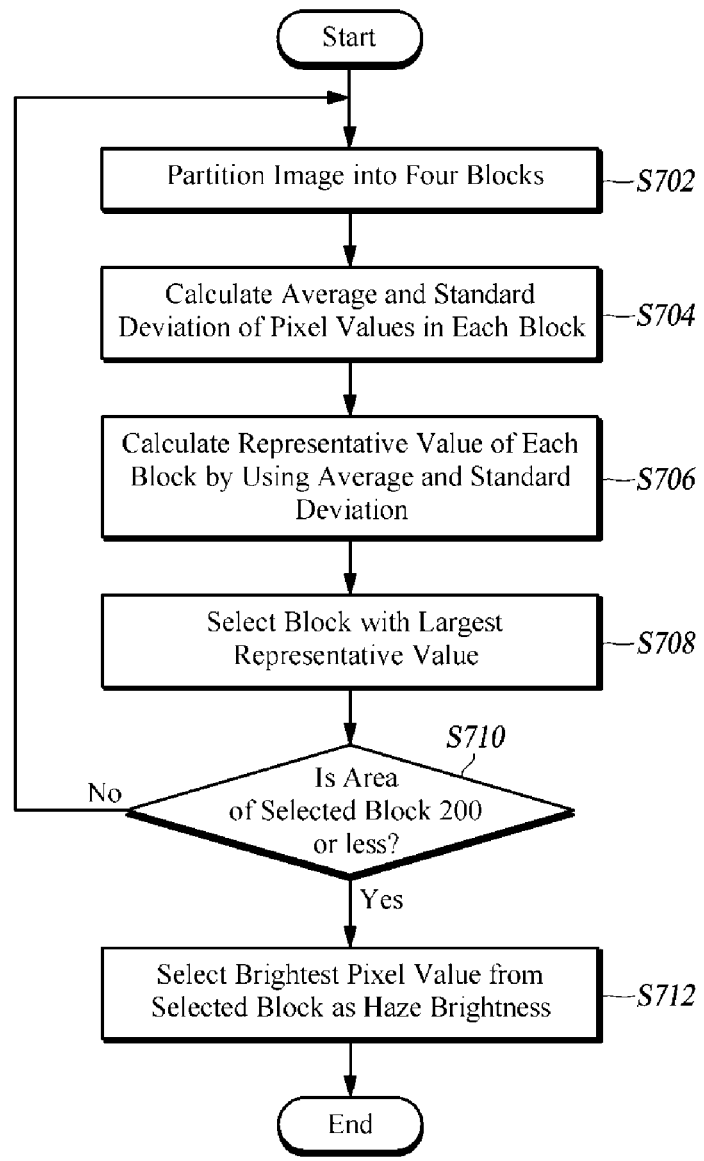
FIG. 7 is a flowchart of a method for measuring haze brightness, performed by an image processing apparatus according to at least one embodiment.

FIG. 7 is a flowchart of a method for measuring haze brightness, performed by an image processing apparatus according to at least one embodiment.

Referring to FIG. 7, the image processing apparatus partitions an image containing haze into four blocks (S702), and calculates the pixel average and standard deviation for each block (S704).

Then, the image processing apparatus calculates a representative value per block, generated based on the pixel average and standard deviation for each block (S706). For example, the representative value is a difference between the pixel average and standard deviation for each block.

Subsequently, the image processing apparatus selects one of the blocks having the largest representative value among the calculated representative values (S708), and determines whether the area of the selected block is equal to or less than 200 (S710).

Upon determining in step S710 that the area of the selected block is equal to or less than 200, the image processing apparatus selects and defines the brightest pixel value from the selected block as the haze brightness (S712).

If step S710 determines that the area of the selected block is greater than 200, on the other hand, the image processing apparatus returns to step S702.

Figure 8:
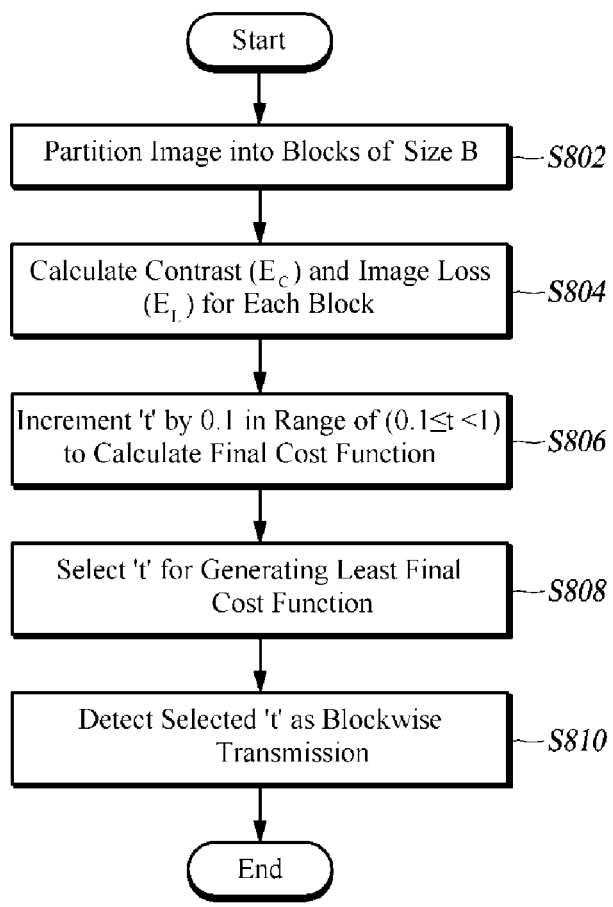
FIG. 8 is a flowchart of a method for detecting a blockwise transmission, performed by an image processing apparatus according to at least one embodiment.

FIG. 8 is a flowchart of a method for detecting a blockwise transmission, performed by an image processing apparatus according to at least one embodiment.

Referring to FIG. 8, the image processing apparatus partitions an image containing haze into blocks of size B (S802).

Subsequent to step S802, the image processing apparatus calculates a contrast and an image loss for each block while changing the transmission t in a predetermined range by a predetermined rate (S804), e.g., for values of the transmission t at 0.1, 0.2, etc. The method performed by the image processing apparatus for calculating the contrast and the image loss has been described above in detail with reference to FIG. 3.

Subsequent to step S804, the image processing apparatus calculates a final cost function value per block based on the contrast and the image loss (S806), and selects a transmission for generating a least final cost function from the calculated final cost function values (S808).

Then, the image processing apparatus detects the selected transmission as a blockwise transmission (S810). For example, for a value of the transmission t, e.g., for t=0.1, the value of t=0.1 is applied to Equation 7 to calculate pixel value $J_p$ at each pixel p for t=0.1, based on pixel value $I_p$ of pixel p in the input image and the calculated haze brightness value A. The pixel values $J_p$ for t=0.1 calculated for the pixels in each block are used to calculate a final cost function value for t=0.1 based on Equations 2-4. Then, the transmission t is changed to a next value, e.g., 0.2, and another final cost function value for t=0.2 is calculated for the block, using Equations 7 and 2-4. As a result, a plurality of final cost function values corresponding to t=0.1, t=0.2, etc. are obtained. The least final cost function value is selected from the obtained plurality of final cost function values, and the corresponding value of the transmission t is selected as the blockwise transmission for the block. For example, assuming that the least final cost function value is obtained at t=0.2, then the blockwise transmission for the block is 0.2. This blockwise transmission (e.g., 0.2) is used as $t_p$ in Equation 6 to calculate a pair of a and b, which result in the least value of Equation 6, for the corresponding block. The calculated pair of a and b values is applied to Equation 5 to calculate a pixelwise transmission for each pixel p. The calculated pixelwise transmission for each pixel p is applied to Equation 7 to calculate the pixel value Jp at pixel p of the dehazed image.

The present disclosure may be used to improve a contrast of an image in various fields, such as flight, airport management, transportation, marine transportation, underwater surveillance, medical imaging (removal of a haze component generated by gas in the patient's body, etc.), agricultural surveillance and video surveillance cameras.

At least one or some or all components of the image processing apparatus 100, such as one or more of the haze brightness measurer 110, blockwise transmission estimator 120, pixelwise transmission estimator 130, image reconstructor 140, image partitioning module 112, representative value computing module 114, pixel value selecting module 116, image partitioning module 122, cost function calculating module 124, final cost function calculating module 126, and blockwise transmission detecting module 128, is/are implemented by one or more processors and/or application-specific integrated circuits (ASICs). In some embodiments, one or more of the components is/are implemented in hardware, or in the form of one or more computer programs having program modules residing in one or more non-transitory computer readable media for causing a processor or microprocessor to execute functions of the hardware equivalents. The non-transitory computer readable media includes a ROM, a RAM, a CD-ROM, a magnetic tape, a floppy disk, an optical data storage device, magnetic recording media, optical recording media and the like. For example, removal of the haze from the still image may be implemented as a program stored on a non-transitory computer readable medium. Codes or code segments constituting such a program are understood by a person ordinarily skilled in the art and are within the scope of various embodiments.

As described above, embodiments in the present disclosure are highly useful for application in an image processing apparatus and method for effectively estimating and removing a haze component from a still image to improve image quality and differentially improving a contrast based on depth information of the image. In some embodiments, a concentration of haze per pixel may be estimated through calculation of a transmission and the haze may be differentially removed per pixel, thereby effectively removing the haze from an image irrespective of how the haze is distributed in the image.

Although exemplary embodiments of the present disclosure have been described for illustrative purposes, those skilled in the art will appreciate that various modifications, additions and substitutions are possible, without departing from various characteristics of the disclosure. Therefore, exemplary embodiments of the present disclosure have been described for the sake of brevity and clarity. Accordingly, one of ordinary skill would understand the scope of the disclosure is not limited by the embodiments explicitly described above but by the claims and equivalents thereof.

The invention claimed is:

1. An image processing apparatus for removing haze from an image, the apparatus comprising:
   a haze brightness measurer configured to measure haze brightness in the image;
   a transmission estimator configured to
      estimate a blockwise transmission based on a final cost function value calculated by a contrast and an image loss of the image, and
      estimate a pixelwise transmission by using the blockwise transmission; and
   an image reconstructor configured to generate a reconstructed image by using the haze brightness and the pixelwise transmission.

2. The image processing apparatus of claim 1, wherein the haze brightness measurer comprises:
   an image partitioning module configured to partition the image into a predetermined first number of blocks;
   a representative value computing module configured to
      calculate an average and standard deviation of pixel values per block, and
      calculate a representative value per block by using a difference between the average and standard deviation of the respective block; and
   a pixel value selecting module configured to
      select one of the blocks, having a largest representative value among the representative values obtained for the respective blocks and,
      when the selected block has an area equal to or less than a preset area, select a brightest pixel value of the selected block as the haze brightness.

3. The image processing apparatus of claim 1, wherein the transmission estimator comprises:
   a blockwise transmission estimator configured to
      partition the image into a predetermined second number of blocks, and
      estimate the blockwise transmission for each block by using a final cost function calculated by a contrast and an image loss per block; and
   a pixelwise transmission estimator configured to convert the blockwise transmission into the pixelwise transmission by applying an edge-preserving filter.

4. The image processing apparatus of claim 3, wherein the blockwise transmission estimator comprises:
   an image partitioning module configured to partition the image into the predetermined second number of blocks;
   a cost function calculating module configured to calculate a contrast and an image loss per block while changing a transmission to have various transmission values in a predetermined range;
   a final cost function calculating module configured to calculate, for each of the various transmission values in the predetermined range, a final cost function value per block by using the contrast and the image loss; and
   a blockwise transmission detecting module configured to detect a transmission value corresponding to a least final cost function value among the calculated final cost function values, as the blockwise transmission.

5. The image processing apparatus of claim 4, wherein the cost function calculating module is configured to multiply a variance generated from using a brightness value of each pixel by −1 to obtain the contrast.

6. The image processing apparatus of claim 4, wherein the cost function calculating module is configured to calculate the image loss by using an area of a region having pixel values less than '0' or greater than '255'.

7. The image processing apparatus of claim 4, wherein the predetermined range is between 0 and 1.

8. The image processing apparatus of claim 3, wherein the pixelwise transmission estimator is configured to
   obtain, for each pixel in a block, an approximate transmission,
   calculate a variable value for generating a least difference between the blockwise transmission of the block and the approximate transmissions of the pixels in the block, and
   estimate an approximate transmission based on the calculated variable value as the pixelwise transmission.

9. A method performed by at least one processor for dehazing an image, the method comprising:
   (a) measuring haze brightness in the image;
   (b) estimating a blockwise transmission based on a final cost function value calculated by a contrast and an image loss of the image, and estimating a pixelwise transmission by using the blockwise transmission; and (c) generating a reconstructed image by removing haze from the image using the haze brightness and the pixelwise transmission.

10. The method of claim 9, wherein the (a) measuring of the haze brightness comprises:
   partitioning the image into a predetermined first number of blocks;
   calculating an average and standard deviation of pixel values for each of partitioned blocks;
   calculating a representative value per block by using the average and standard deviation;
   selecting one of the blocks, having a largest representative value among the representative values calculated for the respective blocks;
   determining whether the selected block has an area equal to or less than a preset area; and
   selecting a brightest pixel value of the selected block as the haze brightness upon determining that the area of the selected block is equal to or less than the preset area.

11. The method of claim 9, wherein the (b) estimating of the blockwise transmission comprises:
   partitioning the image into a predetermined second number of blocks;
   estimating the blockwise transmission by using a final cost function calculated by a contrast and an image loss per block; and
   converting the blockwise transmission into the pixelwise transmission by applying the blockwise transmission to an edge-preserving filter.

12. The method of claim 11, wherein the estimating of the blockwise transmission comprises:
   calculating a contrast and an image loss per block while changing a transmission to have various transmission values in a predetermined range;
   calculating, for each of the various transmission values in the predetermined range, a final cost function value per block by using the contrast and the image loss; and
   detecting a transmission value corresponding to a least final cost function value among the calculated final cost function values, as the blockwise transmission.

13. The method of claim 11, wherein the converting of the blockwise transmission comprises:
   calculating, for each pixel in a block, an approximate transmission;
   calculating a variable value for generating a least difference between the blockwise transmission of the block and the approximate transmissions of the pixels in the block; and
   estimating an approximate transmission based on the calculated variable value, as the pixelwise transmission.

14. A non-transitory computer readable medium containing executable codes for causing, when executed by at least one processor, the at least one processor to perform:
   measuring haze brightness in an image;
   estimating a blockwise transmission based on a final cost function value calculated by a contrast and an image loss of the image;
   estimating a pixelwise transmission by using the blockwise transmission; and
   generating a reconstructed image by removing haze from the image using the haze brightness and the pixelwise transmission.

* * * * *